United States Patent
Chen et al.

(10) Patent No.: US 12,151,963 B2
(45) Date of Patent: Nov. 26, 2024

(54) METHODS FOR SEPARATING AND TRANSPORTING A GLASS SHEET FROM A GLASS RIBBON

(71) Applicant: Corning Incorporated, Corning, NY (US)

(72) Inventors: Cheng-Ci Chen, Taichung (TW); Nils Paul Fornell, Harrodsburg, KY (US); Shun-Hsing Hsiao, Taichung (TW); Chia-Yang Lee, Taichung (TW); Yu-Ting Lee, Taipei (TW)

(73) Assignee: CORNING INCORPORATED, Corning, NY (US)

( * ) Notice: Subject to any disclaimer, the term of this patent is extended or adjusted under 35 U.S.C. 154(b) by 388 days.

(21) Appl. No.: 17/619,823

(22) PCT Filed: Jun. 10, 2020

(86) PCT No.: PCT/US2020/036902
§ 371 (c)(1),
(2) Date: Dec. 16, 2021

(87) PCT Pub. No.: WO2020/263564
PCT Pub. Date: Dec. 30, 2020

(65) Prior Publication Data
US 2022/0298054 A1  Sep. 22, 2022

Related U.S. Application Data

(60) Provisional application No. 62/866,931, filed on Jun. 26, 2019.

(51) Int. Cl.
*C03B 33/033*  (2006.01)
*B65G 47/91*  (2006.01)
(Continued)

(52) U.S. Cl.
CPC .......... *C03B 33/033* (2013.01); *B65G 47/918* (2013.01); *B65G 49/061* (2013.01);
(Continued)

(58) Field of Classification Search
None
See application file for complete search history.

(56) References Cited

U.S. PATENT DOCUMENTS

2004/0240972 A1  12/2004  Mori et al.
2004/0240981 A1  12/2004  Dothan et al.
(Continued)

FOREIGN PATENT DOCUMENTS

CN  200974243 Y  11/2007
CN  104470863 A  3/2015
(Continued)

OTHER PUBLICATIONS

Chinese Patent Application No. 202080058820.X, Office Action dated Feb. 24, 2023, 3 pages (English Translation only), Chinese Patent Office.
(Continued)

*Primary Examiner* — Queenie S Dehghan
(74) *Attorney, Agent, or Firm* — Kevin M. Able

(57) ABSTRACT

A method for separating and transporting a glass sheet from a glass ribbon includes drawing the glass ribbon along a draw path in a conveyance direction, scoring the glass ribbon with a scoring device, to produce a score line across at least a portion of a width of the glass ribbon, engaging a first edge of the glass ribbon at a first position downstream of the score line in the conveyance direction with a first robotic handling device, engaging a second edge of the glass ribbon at a second position downstream of the score line in the conveyance direction with a second robotic handling device, and synchronously moving the first robotic handling
(Continued)

device and the second robotic handling device to bend the glass ribbon about the score line and separate the glass sheet from the glass ribbon.

17 Claims, 8 Drawing Sheets

(51) Int. Cl.
  *B65G 49/06* (2006.01)
  *C03B 33/02* (2006.01)
  *C03B 33/03* (2006.01)
(52) U.S. Cl.
  CPC ......... *B65G 49/063* (2013.01); *B65G 49/067* (2013.01); *C03B 33/0215* (2013.01); *C03B 33/03* (2013.01); *B65G 2201/022* (2013.01); *B65G 2249/04* (2013.01)

(56) References Cited

U.S. PATENT DOCUMENTS

| | | |
|---|---|---|
| 2006/0099064 A1 | 5/2006 | Anaki et al. |
| 2007/0095108 A1 | 5/2007 | Kirby et al. |
| 2009/0107182 A1 | 4/2009 | Anderson et al. |
| 2010/0287991 A1 | 11/2010 | Brown et al. |
| 2011/0126593 A1 | 6/2011 | Abdul-Rahman et al. |
| 2012/0103018 A1 | 5/2012 | Lu et al. |
| 2013/0184851 A1 | 7/2013 | Shimono |
| 2014/0373572 A1 | 12/2014 | Brown et al. |
| 2016/0304385 A1 | 10/2016 | Joseph, II |
| 2019/0135674 A1 | 5/2019 | El-Kahlout et al. |
| 2020/0308040 A1 | 10/2020 | Aburada et al. |

FOREIGN PATENT DOCUMENTS

| | | |
|---|---|---|
| CN | 104755397 A | 7/2015 |
| CN | 105084747 A | 11/2015 |
| CN | 105110621 A | 12/2015 |
| CN | 205115277 U | 3/2016 |
| CN | 105492396 A | 4/2016 |
| CN | 206408110 U | 8/2017 |
| CN | 106865969 B | 11/2017 |
| CN | 206705252 U | 12/2017 |
| CN | 108438903 A | 8/2018 |
| CN | 207877578 U | 9/2018 |
| CN | 108640495 A | 10/2018 |
| CN | 109071300 A | 12/2018 |
| CN | 109311722 A | 2/2019 |
| JP | 2018-076213 A | 5/2018 |
| JP | 6351715 B2 | 1/2022 |
| KR | 10-2007-0055570 A | 5/2007 |
| KR | 10-0822280 B1 | 4/2008 |
| KR | 10-2011-0038957 A | 4/2011 |
| KR | 10-2012-0079982 A | 7/2012 |
| KR | 10-2014-0140058 A | 12/2014 |
| KR | 10-2018-0008614 A | 1/2018 |
| TW | 201600481 A | 1/2016 |
| TW | 201902839 A | 1/2019 |
| WO | 2014/209833 A1 | 12/2014 |
| WO | 2018/222984 A2 | 12/2018 |

OTHER PUBLICATIONS

International Search Report and Written Opinion of the International Searching Authority; PCT/US2020/036902; dated Sep. 23, 2020; 10 pages; Korean Patent Office.

Taiwanese Patent Application No. 109121559, Office Action dated Nov. 28, 2023, 2 pages (English Translation only), Taiwanese Patent Office.

METHODS FOR SEPARATING AND TRANSPORTING A GLASS SHEET FROM A GLASS RIBBON

CROSS-REFERENCE TO RELATED APPLICATIONS

This application claims the benefit of priority under 35 U.S.C. § 371 of International Application No. PCT/US2020/036902, filed on Jun. 10, 2020, which claims the benefit of priority of U.S. Provisional Application Ser. No. 62/866,931 filed on Jun. 26, 2019 the contents of which are relied upon and incorporated herein by reference in their entity.

BACKGROUND

Field

The present specification generally relates to methods for forming glass sheets from glass ribbons and, more particularly, to methods for separating and/or transporting glass sheets from glass ribbons.

Technical Background

Glass ribbons may be formed by processes such as the fusion draw process or other processes including float and slot draw. The fusion draw process can yield glass ribbons that have surfaces with superior flatness and smoothness when compared to glass ribbons produced by other methods. Individual glass sheets sectioned from glass ribbons formed by the fusion draw process can be used in a variety of devices including flat panel displays, touch sensors, photovoltaic devices and other electronic applications.

Various techniques for separating discrete glass sheets from a glass ribbon, such as during a drawing process, may be used. These techniques generally include restraining a portion of the glass ribbon while the glass ribbon is scored to produce a score line. Thereafter, a discrete glass sheet is separated from the glass ribbon by applying a bending moment about the score line.

While such techniques are effective for separating a discrete glass sheet from a glass ribbon, for example a moving glass ribbon, a need exists for alternative methods for separating discrete glass sheets from glass ribbons. Accordingly, a need exists for faster and/or more efficient sheet separation methods.

SUMMARY

Additional features and advantages of the present disclosure will be set forth in the detailed description which follows, and in part will be apparent to those skilled in the art from that description or recognized by practicing the embodiments described herein, including the detailed description which follows, the claims, as well as the appended drawings.

According to a first aspect, a method for separating and transporting a glass sheet from a glass ribbon can comprise drawing the glass ribbon a draw path in a conveyance direction, scoring the glass ribbon with a scoring device, thereby producing a score line across at least a portion of a width of the glass ribbon, engaging a first edge of the glass ribbon at a first position downstream of the score line in the conveyance direction with a first robotic handling device, engaging a second edge of the glass ribbon at a second position downstream of the score line in the conveyance direction with a second robotic handling device, and synchronously moving the first robotic handling device and the second robotic handling device to bend the glass ribbon about the score line to separate the glass sheet from the glass ribbon. In some embodiments, the first robotic handling device and the second robot handling device may operate in a master-slave relationship. As used herein, synchronously refers to movements that happen, exist or arise at the same time. Synchronous operation does not imply a master-slave relationship but does not preclude it.

In a second aspect according to the first aspect, the method may further comprise engaging the glass sheet with a third robotic handling device between an engagement position of the first robotic handling device on the glass sheet and an engagement position of the second robotic handling device on the glass sheet and releasing the glass sheet from the first robotic handling device and the second robotic handling device.

In a third aspect according to any preceding aspect, the method may further comprise adjusting an engagement plane of the first robotic handling device relative to the draw path to be substantially parallel to a plane of the glass ribbon, and adjusting an engagement plane of the second robotic handling device relative to the draw path independent of the first robotic handling device to be substantially parallel to the plane of the glass ribbon.

In a fourth aspect according to any preceding aspect, the method may further comprise applying tension across the width of the glass ribbon with the first robotic handling device and the second robotic handling device transverse to the conveyance direction.

In a fifth aspect according to any preceding aspect, the glass ribbon may comprise a first major surface opposite a second major surface, wherein the first robotic handling device and the second robotic handling device contact only the second major surface.

In a sixth aspect according to any preceding aspect, wherein the first robotic handling device can comprise a first plurality of gripping devices comprising a first plurality of suction devices, and the second robotic handling device can comprise a second plurality of gripping devices comprising a second plurality of suction devices.

In a seventh aspect according to any preceding aspect, each of the first robotic handling device and the second robotic handling device can be mounted to a rail and the positioning of the first robotic handling device and the second robotic handling device can be adjustable along the rail. The method may still further comprise moving the first robotic handling device and the second robotic handling device along the rail to transport the glass sheet from the draw path.

In an eighth aspect, a method for separating and transporting a glass sheet from a glass ribbon can comprise drawing the glass ribbon a draw path in a conveyance direction, the glass ribbon defining a first major surface opposite a second major surface, scoring the glass ribbon with a scoring device, thereby producing a score line across at least a portion of the first major surface of the glass ribbon, engaging a first edge of the second major surface of the glass ribbon at a first position downstream of the score line in the conveyance direction with a first robotic handling device, engaging a second edge of the second major surface of the glass ribbon at a second position downstream of the score line in the conveyance direction with a second robotic handling device, and synchronously moving the first robotic handling device and the second robotic handling device to bend the glass ribbon about the score line to separate the glass sheet from the glass ribbon.

In a ninth aspect according to the eighth aspect, the method may further comprise engaging the second major surface of the glass sheet with a third robotic handling device between an engagement position of the first robotic handling device on the glass sheet and an engagement position of the second robotic handling device on the glass sheet, and releasing the glass sheet from the first robotic handling device and the second robotic handling device.

In a tenth aspect according to the eighth or the ninth aspect, the method may further comprise adjusting an engagement plane of the first robotic handling device relative to the draw path to be substantially parallel to a plane of the glass ribbon, and adjusting an engagement plane of the second robotic handling device relative to the draw path independent of the first robotic handling device to be substantially parallel to the plane of the glass ribbon.

In an eleventh aspect according to the any of the eighth through the tenth aspect, the method may further comprise applying tension across a width of the glass ribbon transverse to the conveyance direction with the first robotic handling device and the second robotic handling device.

In a twelfth aspect according to any of the eighth through the eleventh aspect, the first robotic handling device can comprise a first plurality of suction devices, and the second robotic handling device can comprise a second plurality of suction devices.

In a thirteenth aspect according to the twelfth aspect, the first plurality of suction devices can comprises two or more groups of suction devices, and a flow of vacuum pressure through the two or more groups of suction devices of the first plurality of suction devices can be independently controllable, and the second plurality of suction devices can comprise two or more groups of suction devices, and a flow of vacuum pressure through the two or more groups of suction devices of the second plurality of suction devices can be independently controllable.

In a fourteenth aspect, a method of manufacturing a glass sheeting can comprise forming a glass ribbon with a fusion glass manufacturing assembly, drawing the glass ribbon a draw path in a conveyance direction, scoring the glass ribbon with a scoring device, thereby producing a score line across at least a portion of a width of the glass ribbon, engaging a first edge of the glass ribbon at a first position downstream of the score line in the conveyance direction with a first robotic handling device, engaging a second edge of the glass ribbon at a second position downstream of the score line in the conveyance direction with a second robotic handling device, and synchronously moving the first robotic handling device and the second robotic handling device to bend the glass ribbon about the score line to separate the glass sheet from the glass ribbon.

In a fifteenth aspect according to the fourteenth aspect, the method may further comprise engaging the glass sheet with a third robotic handling device between an engagement position of the first robotic handling device on the glass sheet and an engagement position of the second robotic handling device on the glass sheet and releasing the glass sheet from the first robotic handling device and the second robotic handling device.

In a sixteenth aspect according to the fourteenth aspect or the fifteenth aspect, the method may further comprise adjusting an engagement plane of the first robotic handling device relative to the draw path to be substantially parallel to a plane of the glass ribbon, and adjusting an engagement plane of the second robotic handling device relative to the draw path independent of the first robotic handling device to be substantially parallel to the plane of the glass ribbon.

In a seventeenth aspect according to any of the fourteenth aspect through the sixteenth aspect, the method may further comprise applying a tension across the width of the glass ribbon with the first robotic handling device and the second robotic handling device transverse to the conveyance direction.

In an eighteenth aspect according to any of the fourteenth aspect through the seventeenth aspect, the glass ribbon may comprise a first major surface opposite a second major surface, and the first robotic handling device and the second robotic handling device may contact only the second major surface.

In a nineteenth aspect according to any of the fourteenth aspect through the eighteenth, the first robotic handling device may comprise a first plurality of suction devices, and the first plurality of suction devices may comprise two or more groups of suction devices, and a flow of vacuum pressure through the two or more groups of suction devices of the first plurality of suction devices can be independently controllable.

In a twentieth aspect according to any of the fourteenth aspect through the nineteenth aspect, the second robotic handling device can comprise a second plurality of suction devices, and the second plurality of suction devices can comprise two or more groups of suction devices, and a flow of vacuum pressure through the two or more groups of suction devices of the second plurality of suction devices can be independently controllable.

Both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description explain the principles and operations of the claimed subject matter.

DETAILED DESCRIPTION

Figure 1:
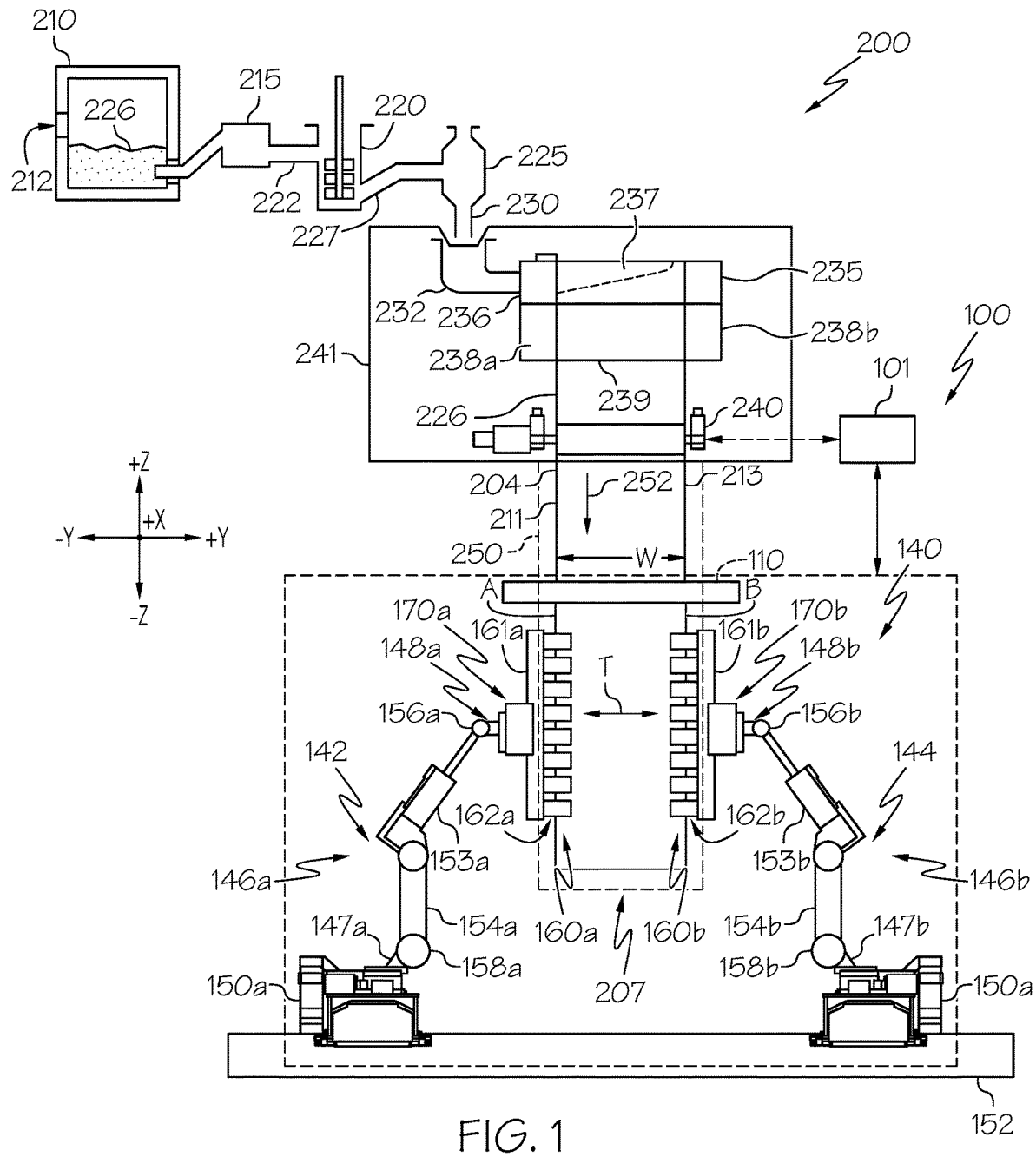
FIG. 1 schematically illustrates a glass manufacturing apparatus according to one or more embodiments show and described herein.

Reference will now be made in detail to various methods of separating a glass sheet from a glass ribbon, for example a glass ribbon drawn continuously from a forming vessel, examples of which are illustrated in the accompanying drawings. Whenever possible, the same reference numerals will be used throughout the drawings to refer to the same or like parts.

FIG. 1 schematically depicts a glass manufacturing apparatus for producing a glass ribbon, wherein molten glass is drawn into a glass ribbon along a draw path. As the glass ribbon exists the glass manufacturing apparatus, a glass separation apparatus scores and separates a glass sheet from an end of the glass ribbon. The glass separation apparatus comprises a first robotic handling device and a second robotic handling device. The first robotic handling device engages a first edge of the glass ribbon at a position downstream of the score line in the conveyance direction, and the second robotic handling device engages a second edge of the glass ribbon at a position downstream of the score line in the conveyance direction. The first robotic handling device and the second robotic handling device synchronously move to bend the glass ribbon about the score line to separate the glass sheet from the glass ribbon. Using two robots that engage the glass ribbon for separating a glass sheet instead of a single robot allows for the use of smaller and/or faster robots. Additionally, a dual robotic handling device has the added benefit of reducing air turbulence which may be caused by a single robot approaching and engaging a surface of the glass ribbon, as much of the robotic motion of the first and second robotic handling devices may be to the side of the glass ribbon. Methods for separating a glass sheet from a glass ribbon using the dual robotic handling device will be described in further detail herein with specific reference to the appended figures.

Directional terms as used herein—for example up, down, right, left, front, back, top, bottom, above, below—are made only with reference to the figures as drawn and are not intended to imply absolute orientation unless otherwise specified.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, an embodiment of a glass manufacturing apparatus 200 for forming a glass ribbon 204 is schematically depicted. The glass manufacturing apparatus 200 comprises a melting vessel 210, a fining vessel 215, a mixing vessel 220, a delivery vessel 225, a forming apparatus 241 and a glass separation apparatus 100. Glass batch materials are introduced into the melting vessel 210 as indicated by arrow 212. The batch materials are melted to form a molten material, hereinafter molten glass 226. The fining vessel 215 receives the molten glass 226 from the melting vessel 210 and removes gas entrained in the molten glass 226 (i.e., bubbles). The fining vessel 215 is in fluid communication with the mixing vessel 220 by a connecting tube 222. The mixing vessel 220 is, in turn, in fluid communication with the delivery vessel 225 by a connecting tube 227.

The delivery vessel 225 supplies the molten glass 226 to the forming apparatus 241 through a downcomer 230. The forming apparatus 241 comprises an inlet 232, a forming vessel 235, and a pull roll apparatus 240. In the embodiment depicted in FIG. 1, the forming vessel 235 is depicted and described as a fusion forming vessel. However, other embodiments of forming vessels for forming glass ribbons by down-draw methods are contemplated and possible including, without limitation, a slot-draw forming vessel.

As shown in FIG. 1, the molten glass 226 from the downcomer 230 flows into an inlet 232 which leads to the forming vessel 235. The forming vessel 235 comprises an opening 236 that receives the molten glass 226. The molten glass 226 flows into a trough 237 of the forming vessel 235 and then overflows and runs down two sides 238a and 238b of the forming vessel 235 before fusing together at a root 239 of the forming vessel 235. The root 239 is defined by the intersection of the two sides 238a and 238b and is the location where the two streams of molten glass 226 join (e.g., fuse) before being drawn downward by the pull roll apparatus 240 to form the glass ribbon 204. The glass ribbon 204 is drawn along a draw path 250 that extends from the root 239 of the forming vessel 235 in a downward conveyance direction 252 (i.e., the −Z-direction of the coordinate axes depicted in the figures) and through the glass separation apparatus 100. In the embodiments described herein, the draw path 250 is substantially vertical (i.e., the draw path 250 is parallel to the Y-Z plane of the coordinate axes depicted in the drawings), although in other embodiments, the draw path may deviate from vertical. The terms "upstream" and "downstream," unless otherwise noted or apparent from the description, refer to relative positioning along the draw path 250 with "upstream" referring to the +Z direction of the coordinate axes depicted in the figures and "downstream" referring to the −Z direction of the coordinate axes depicted in the figures. For example, a first element positioned on the draw path 250 closer to the forming vessel 235 than a second element is positioned upstream of the second element. The second element would be positioned downstream of the first element The pull roll apparatus 240 is provided to assist in drawing the glass ribbon 204 from the root 239 of forming vessel 235 and to also draw the glass ribbon 204 to the desired thickness. The pull roll apparatus 240 may also be provided to maintain vertical and horizontal ribbon tension within the glass ribbon 204 above the glass separation apparatus 100. In embodiments, the pull roll apparatus may be as described in International Patent Application Publication Number WO 2017/223032, entitled "Multi-elevation Drive Apparatus for a Glass Manufacturing Apparatus with Tension Control in Bottom of Draw," filed Jun. 20, 2018, hereby incorporated by reference in its entirety.

The glass ribbon 204 exits the forming apparatus 241 at exit position 10 (see FIG. 2A) and is directed along the draw path 250 into the glass separation apparatus 100. The glass ribbon 204 defines an A surface (or plane) opposite a B surface (or plane) of the glass ribbon 204. That is, the A surface is a first major surface of the glass ribbon 204 and the B surface is a second major surface of the glass ribbon 204 opposite the A surface. The A surface and the B surface are generally parallel to one another. In embodiments, the A surface of the glass ribbon 204 refers to the major surface of the glass ribbon comprising a quality area that does not experience mechanical contact from processing equipment during the formation of the glass ribbon or during the separation of glass sheets from the glass ribbon 204 (while edge portions of the glass ribbon may be contacted, such as by pulling rolls, these edge regions are subsequently removed). As the glass ribbon 204 passes through the glass separation apparatus 100, the glass separation apparatus 100 may score the glass ribbon 204 with a scoring device 112 (illustrated in FIG. 2A) and then bend the glass ribbon 204 to separate a glass sheet 205 from the glass ribbon 204 (see FIG. 2C).

In conventional glass separation apparatuses, the process of engaging the glass ribbon 204 to bend the glass ribbon 204 and separate a glass sheet 205 from the glass ribbon 204 may cause unwanted perturbations (e.g., mechanical vibrations and/or fluctuations in the position of the glass ribbon) within the glass ribbon 204 which may propagate up the glass ribbon 204, potentially disrupting the glass forming process within the forming apparatus 241. For example, mechanical vibrations and fluctuations in the position of the glass ribbon 204 may be caused by air turbulence resulting from the motion of a single robot approaching and engaging one of the major surfaces of the glass ribbon 204. That is, as the single robot approaches a major surface of the glass ribbon 204 and a high speed, air between the robot and the glass ribbon 204 is displaced towards the surface of the glass ribbon 204, potentially causing motion and displacement of the glass ribbon 204 from the draw path 250 and related mechanical vibrations which can propagate through the glass ribbon 204 in an upstream direction. Embodiments described herein use a dual robotic handling device 140 for engaging and bending the glass ribbon 204 about a score line 208, thereby mitigating or even eliminating these mechanical vibrations and fluctuations in the position of the glass ribbon.

In the embodiments described herein, the dual robotic handling device 140 can comprise a first robotic handling device 142 and a second robotic handling device 144. The first robotic handling device 142 and the second robotic handling device 144 may be substantially identical to one another albeit arranged on laterally opposites sides of the draw path 250 in the +/−Y direction of the coordinate axes depicted in the figures. As the robotic handling devices 142, 144 engage the glass ribbon 204 from laterally opposing sides of the draw path 250, perturbations in the glass ribbon 204 due to air turbulence against the major surfaces of the glass ribbon 204 are mitigated. Using a dual robotic handling device 140 as compared to a single robotic handling device may also allow for the processing of larger sheet sizes using smaller robots, as the weight of the glass sheet 205 may be supported by two separate devices. Additionally, using a dual robotic handling device 140 may allow for hand-off of the separated glass sheet 205 without rotation so that another handling device contacts an opposite side of the glass sheet 205. Instead, and as will be described in greater detail below in reference to FIGS. 4A and 4B, during hand-off, a third robotic handling device 300 may engage the glass sheet 205 on the same side of the glass sheet 205 as the dual robotic handling devices. This may help preserve surface quality of the opposite surface of the glass sheet 205 (i.e., the A surface of the glass sheet). Additionally, the first robotic handling device 142 and the second robotic handling device may comprise adjustable end-of-arm tools (e.g., end effectors 160a, 160b). These and additional features will be described in greater detail below.

Still referring to FIG. 1, a controller 101 may be communicatively coupled to the glass separation apparatus 100. As will be described in greater detail herein, the controller 101 may control movement and actuation of various components of the glass separation apparatus 100 to pull, score, bend, and separate a glass sheet 205 from the glass ribbon 204. For example, the controller 101 may comprise a processor and a memory storing logic, such as computer readable and executable instructions, that when executed by the processor, causes the glass separation apparatus 100 to score and/or separate the glass sheet 205 from the glass ribbon 204. The controller 101 may also be communicatively coupled to the pull roll apparatus 240 to control pulling force and/or speed applied to the glass ribbon 204 to draw the glass ribbon 204 from the forming apparatus 241 along the draw path 250 in the conveyance direction 252.

Referring now to FIGS. 1 and 2A-2C, FIG. 1 generally illustrates a front schematic view of the glass separation apparatus 100 and FIGS. 2A-2D illustrate the glass separation apparatus 100 in vertical cross-section. The glass separation apparatus 100 may comprise a moving scoring apparatus 110 including a scoring device 112 and a nosing 116. The glass separation apparatus 100 may further comprise a dual robotic handling device 140 including the first robotic handling device 142 and the second robotic handling device 144. As will be described in greater detail herein, the moving scoring apparatus 110 may facilitate scoring the glass ribbon 204 as it travels through the glass separation apparatus 100 to produce a score line 208 (e.g., score line 208 illustrated in FIG. 2B-2C) and the dual robotic handling device 140 may facilitate the application of a bending moment to at least a portion of the glass ribbon 204 to separate a glass sheet 205 from the glass ribbon 204 at the score line 208.

The scoring device 112 may be positioned along the draw path 250 and configured to score the glass ribbon 204 to produce a score line 208 across at least a portion of a width, W, of the glass ribbon 204 perpendicular to the conveyance direction 252 as the glass ribbon 204 is drawn on the draw path 250 in the conveyance direction 252. The scoring device 112 may be positioned on the draw path 250 opposite of the nosing 116 such that as the glass ribbon 204 is drawn on the draw path 250, the glass ribbon 204 passes between the scoring device 112 and the nosing 116. Accordingly, in the illustrated embodiment, the scoring device 112 may contact the glass ribbon 204 on the A surface of the glass ribbon 204. The nosing 116 may contact the glass ribbon 204 on the B surface of the glass ribbon 204.

Figure 2A:
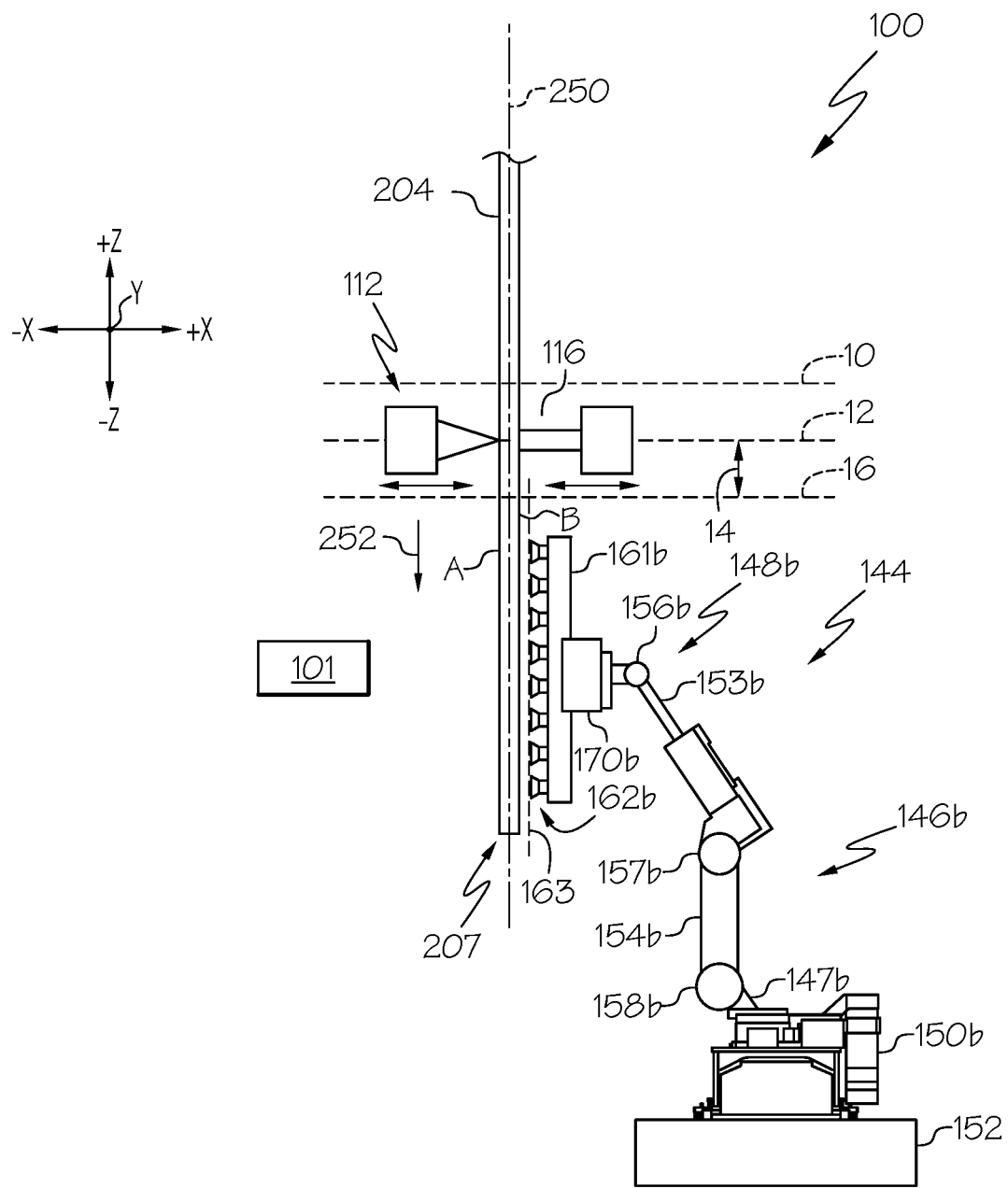
FIG. 2A schematically illustrates a cross-section of a glass separation apparatus engaged with a glass ribbon on a draw path of the glass ribbon according to one or more embodiments shown and described herein.
Figure 2B:
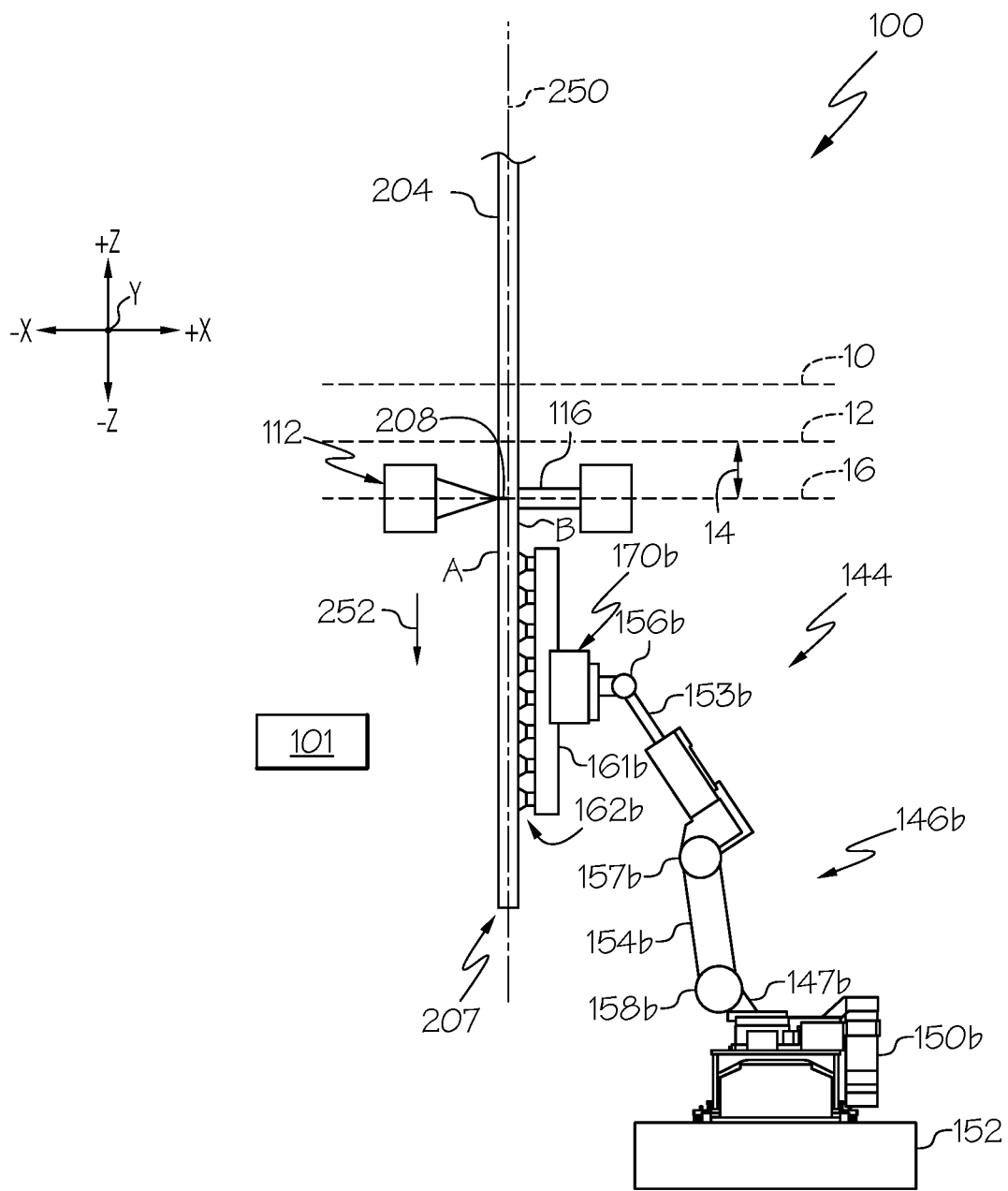
FIG. 2B schematically illustrates a cross-section of the glass separation apparatus of FIG. 2A, as the glass separation apparatus produces a score line on a glass ribbon according to one or more embodiments shown and described herein.
Figure 2C:
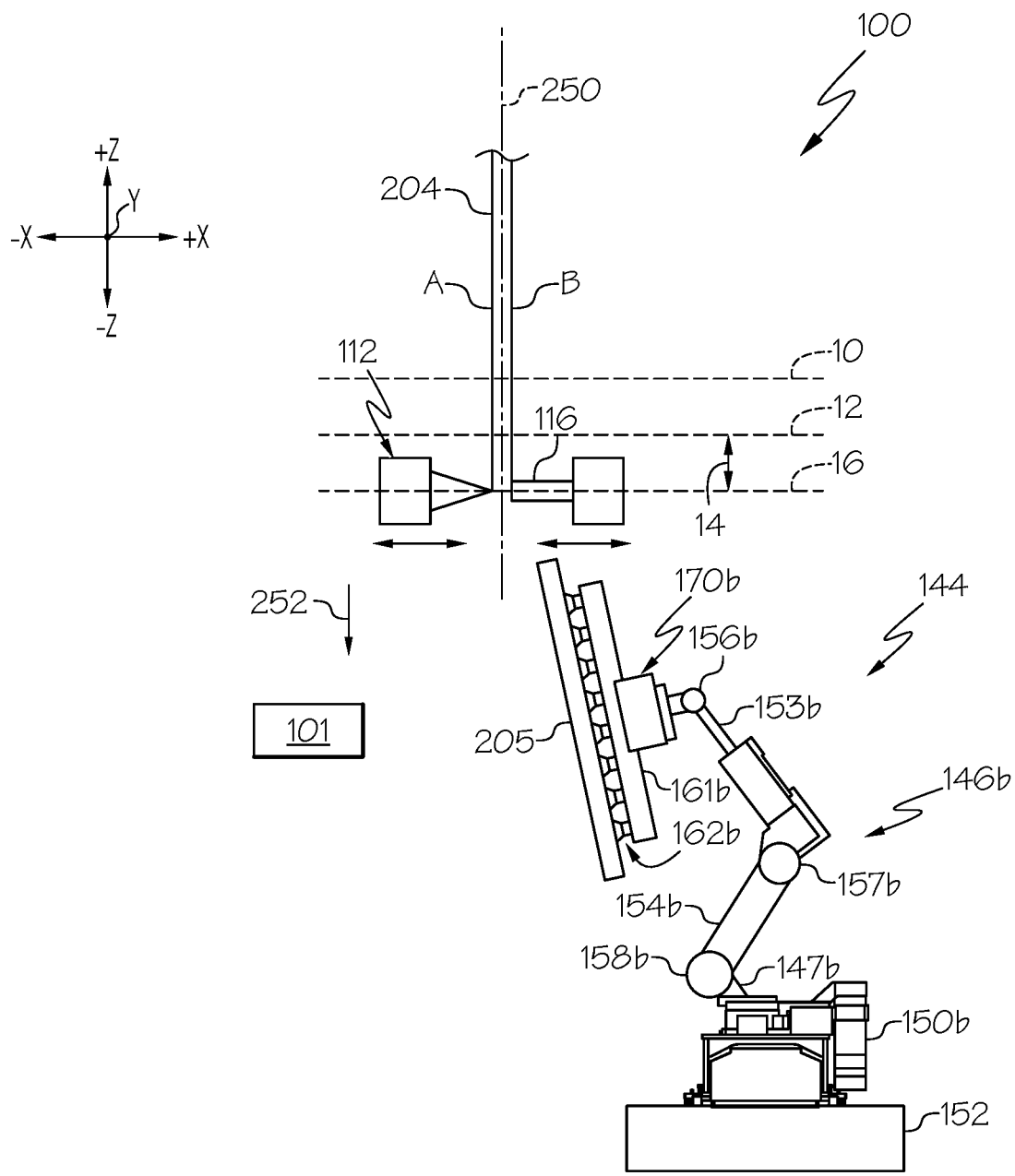
FIG. 2C schematically illustrates a cross-section of the glass separation apparatus of FIG. 2A as the glass separation apparatus separates a glass sheet from the glass ribbon according to one or more embodiments shown and described herein.

In the embodiment shown in FIG. 2A-2C, the scoring device 112 can comprise a mechanical scoring device, such as a scoring wheel or scoring point. Alternatively, the scoring device 112 may be a laser scoring device. The scoring device 112 can be coupled to an actuator (not shown), such as a linear actuator, pneumatic actuator, or the like, which is operable to traverse the scoring device 112 in the +/−Y-direction across a width W (as shown in FIG. 1) of the glass ribbon 204. The scoring device 112 may also be coupled to an actuator (not shown), such as a linear actuator, pneumatic actuator, or the like, which facilitates positioning the scoring device 112 in the +/−Z-direction as the scoring device 112 is traversed in the +/−Y-direction. That is, the scoring device 112 can be positioned such that the scoring device 112, specifically the scoring wheel or scoring point, is directly opposite the nosing 116. Accordingly, the scoring device 112 may be utilized to score a glass ribbon 204 drawn on the draw path 250 in the conveyance direction 252 while the glass ribbon 204 is supported on the nosing 116 thereby introducing a score line 208 in the glass ribbon 204 opposite the nosing 116. A suitable scoring device for use in conjunction with the methods described herein is disclosed in U.S. Patent Application Publication No. 2008/0276785 filed May 9, 2007 and entitled "Constant Force scoring device and Method for Using the Same," the entirety of which is incorporated herein by reference. However, other scoring devices are contemplated and possible.

The various actuators of the scoring device 112 may be communicatively coupled to the controller 101, described above, such that the controller 101 may execute logic to move and/or operate the scoring device 112 with various actuators to form a score line 208 across the glass ribbon 204.

Still referring to FIGS. 2A-2C and as noted above, the nosing 116 can be positioned on an opposite side of the draw path 250 from the scoring device 112. The nosing 116 may extend across an entire width of the glass ribbon 204 to support the entire width of the glass ribbon 204 during scoring. That is, the nosing 116 may contact the glass ribbon 204 on the B side of the glass ribbon 204 such that the glass ribbon 204 is impinged between the scoring device 112 and the nosing 116. In some embodiments, the nosing 116 can be formed from a material or materials that will not damage the surface of the glass ribbon 204 when the nosing 116 contacts the surface of the glass ribbon 204. In some embodiments, the nosing 116 can be formed from polymeric materials, such as thermoplastics, thermosets, or thermoplastic elastomers. However, other materials are contemplated and possible.

In embodiments, the nosing 116 may be coupled to an actuator (not shown), such as a linear actuator, pneumatic actuator, or the like, which is communicatively coupled to the controller 101 and is operable to move the nosing 116 in the +/−X-direction to position the nosing 116 into and out of contact with the glass ribbon 204. The nosing 116 may also be coupled to an actuator (not shown), such as a linear actuator, pneumatic actuator, or the like, communicatively coupled to the controller 101 which facilitates positioning the nosing 116 in the +/−Z-direction to position the nosing 116 directly opposite the scoring device 112, during scoring. Once scoring is complete, the controller 101, using the various actuators described above, may move the nosing 116 from contact with the glass ribbon 204 and back up to a moving scoring apparatus home position 12 wherein scoring may begin again such that a new score line 208 is produced in the glass ribbon 204.

In some embodiments, the nosing 116 may be configured to deliver a vacuum pressure through the nosing 116 to the glass ribbon 204 to hold the glass ribbon 204 to the nosing 116. For example, the nosing 116 may be plumbed to a vacuum pressure source (e.g., a vacuum pump). The controller 101 may be communicatively coupled to the vacuum pressure source to draw vacuum pressure through the nosing 116.

In operation, as the glass ribbon 204 exits the forming apparatus 241 on the draw path 250 at exit position 10, the controller 101 may execute logic to cause both the scoring device 112 and the nosing 116 to move into contact with the glass ribbon 204 at the moving scoring apparatus home position 12. The controller 101 may then move, with the various actuators described above, the scoring device 112 (both across the width of the glass ribbon 204 and in the −Z-direction) and the nosing 116 with the glass ribbon 204 to produce a score line 208 across at least a portion of the glass ribbon 204, such that a score line 208 is formed across at least a portion of the width of the glass ribbon 204 in the scoring zone 14. As scoring is completed by the scoring device 112, the dual robotic handling device 140 engages or is engaged with the glass ribbon 204 downstream of the score line 208. Upon completion of scoring, the dual robotic handling device 140 may bend the glass ribbon 204 about the nosing 116 to separate a glass sheet 205 from the glass ribbon 204.

The dual robotic handling device 140 can comprise the first robotic handling device 142 and the second robotic handling device 144. The first robotic handling device 142 and the second robotic handling device 144 may be positioned proximate to the outlet of forming apparatus 241, downstream of the moving scoring apparatus 110 in the glass conveyance direction 252, to receive a free end 207 of the glass ribbon 204. In the illustrated embodiments, the first robotic handling device 142 and the second robotic handling device 144 can be positioned opposite from the scoring device 112 across the draw path 250 in the lateral direction (i.e., in the +/−Y direction of the coordinate axes depicted in the figures). However, in other embodiments, the first robotic handling device 142 and the second robotic handling device 144 may be positioned on the same side of the draw path 250 as the scoring device 112.

As noted herein, the first robotic handling device 142 and the second robotic handling device 144 may be substantially identical to one another. Accordingly, the description of one of the first robotic handling device 142 or the second robotic handling device 144 may be applicable to the other of the first robotic handling device 142 or the second robotic handling device 144 unless otherwise noted. In some embodiments, the first robotic handling device 142 may be a master robotic handling device, and the second robotic handling device 144 may be a slave robotic handling device, wherein movement of the slave robotic handling device is dependent on movement of and communication with the master robotic handling device. For example, communication between the master robotic handling device and the slave robotic handling device may be facilitated through controller 101. Accordingly, as will be described in greater detail herein, the controller 101 may actuate each of the first robotic handling device 142 and the second robotic handling device 144 in a master-slave relationship or independent from one another.

The first robotic handling device 142 and the second robotic handling device 144 can each comprise a robotic arm 146a, 146b, respectively, configured for multi-axis articulation (e.g., 3-axis articulation, 4-axis articulation, 5-axis articulation, 6-axis articulation, or more). For example, robotic handling devices may comprise multi-axis robotics such a Fanuc R1000 series produced by FANUC America Corporation. To facilitate motion of the robotic arm 146a, 146b, the robotic arm 146a, 146b may comprise a plurality of links (e.g., links 153a, 154a and links 153b, 154b, respectively) coupled to a plurality of joints (e.g., joints 156a, 157b, 158c and joints 156b, 157b, 158b respectively). Various drive mechanisms (e.g., hydraulic actuators, electro-mechanical actuators, pneumatic actuators and combinations thereof) may be used to rotate and position the plurality of links relative to one another to reach a desired configuration of each of the first robotic handling device 142 and the second robotic handling device 144. That is, the controller 101 may communicate with each of the first robotic handling device 142 and the second robotic handling device 144 to control a posture of the robotic arms 146a, 146b to move the first robotic handling device 142 and the second robotic handling device 144 through various glass separation and transport motions.

Figure 2D:
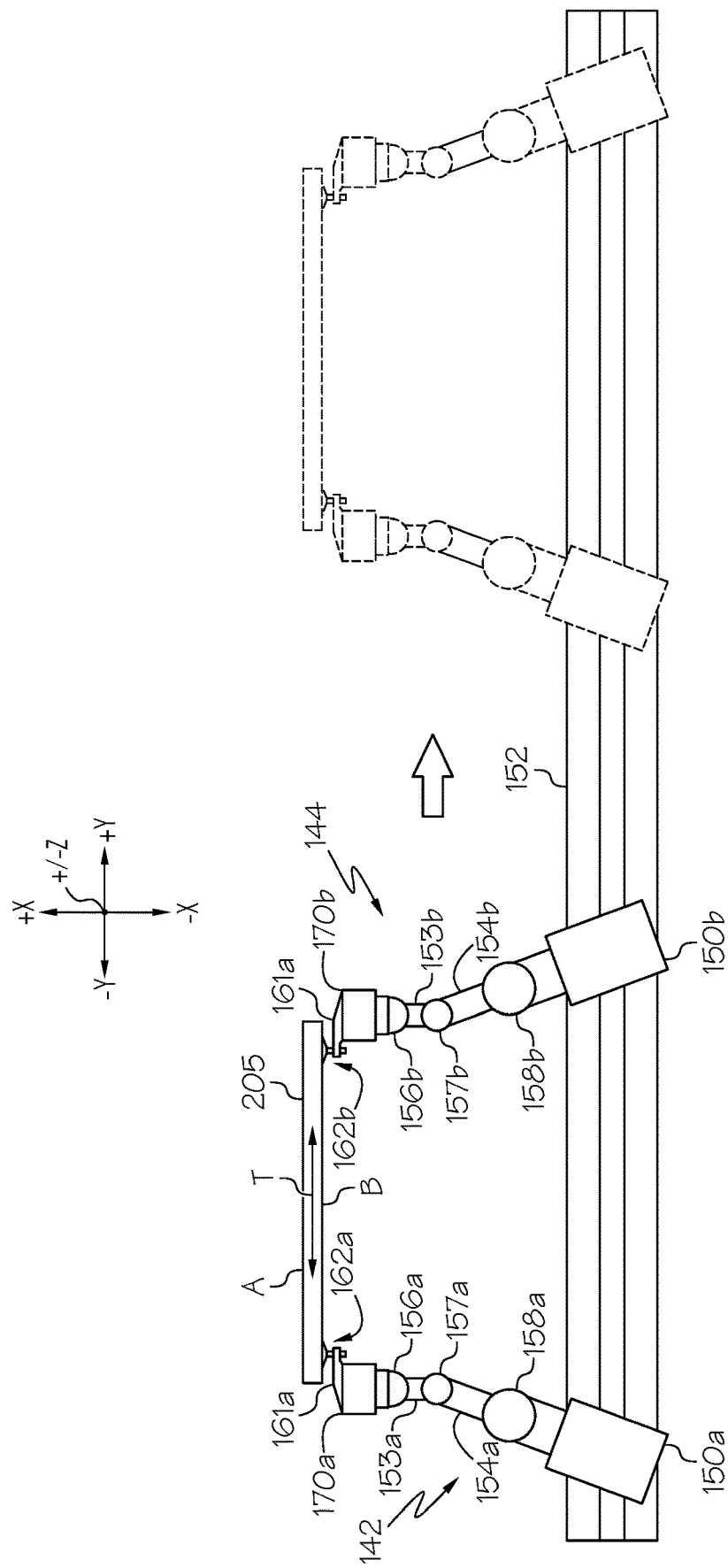
FIG. 2D schematically illustrates a cross-section of the glass separation apparatus along a Y-Z plane of the depicted coordinate axes and transport the glass sheet along a rail according to one or more embodiments shown and described herein.

The first robotic handling device 142 and the second robotic handling device 144 may each comprise a base 150a, 150b, respectively, to which first ends 147a, 147b of the robotic arms 146a, 146b are coupled. The bases 150a, 150b may support rotational movement of the robotic arms 146a, 146b about an axis parallel to the Z axis of the depicted coordinate axes. In some embodiments, and as illustrated in FIGS. 1-2D, the bases 150a, 150b may be mounted to a rail 152 and the robotic handling devices 142, 144 can be configured to move along at least a portion of a length of the rail 152 in the +/−Y direction of the depicted coordinate axes. For example, an actuator (e.g., motorized wheels, pneumatic actuator, hydraulic actuators, electro-mechanical actuators, or the like) may be controlled by the controller 101 to move the first robotic handling device 142 and the second robotic handling device 144 along the rail 152 to a desired position. In some embodiments, the first robotic handling device 142 and/or the second robotic handling device 144 may be independently positioned along the rail 152 by the controller 101. In other embodiments, the bases 150a, 150b of the first robotic handling device 142 and/or the second robotic handling device 144 may be fixedly mounted to a floor, platform, or other surface (e.g., see FIG. 4A).

At a second ends 148a, 148b of the robotic arms 146a, 146b of each of the first robotic handling device 142 and the second robotic handling device 144 are joints 156a, 156b, (also referred to as wrist joints 156a, 156b of the robotic arms 146a, 146b). The wrist joints 156a, 156b may be controlled by the controller 101 to effect positioning of end effectors 160a, 160b coupled to the wrist joints 156a, 156b of robotic arms 146a, 146b, respectively. For example, the wrist joints 156a, 156b may define axes of rotation along axes parallel to the Y axis of the depicted coordinate axes to adjust a position of the end effectors 160a, 160b relative to a plane of the glass ribbon 204. As will be described below, adjustment of the position of the end effectors 160a, 160b to be substantially parallel to the plane of the glass ribbon 204 may aid in engagement with the glass ribbon 204 with the end effectors 160a, 160b.

The end effectors 160a, 160b may be any device capable of engaging and supporting a portion of the glass ribbon 204. For example, the end effectors 160a, 160b may comprise base frames 161a, 161b and a plurality of gripping devices 162a, 162b coupled to the base frames 161a, 161b. The base frames 161a, 161b may be coupled to the wrist joints 156a, 156b and may support the plurality of gripping devices 162a, 162b, respectively. The end effectors 160a, 160a may be sized to engage one edge of the glass ribbon, rather than end effectors arranged to simultaneously engage both edges of the glass ribbon. End effectors arranged to simultaneously engage both edges of the glass ribbon are often heavy, resulting in an increased moment of inertia that can cause a robotic arm to work harder, often leading to slower robotic movements. By providing end effectors 160a and 160b designed to engage only a single edge of the glass ribbon and which are connected to separate robotic arms 146a, 146b allows the end effectors 160a, 160b to be lighter and, in turn, allows for quicker and more efficient movement of the first and second robotic handling devices 142, 144.

Additionally, separate end effectors 160a, 160b may also reduce air turbulence that may cause the free end 207 of the glass ribbon 204 to sway, as the end effectors 160a, 160b may approach the glass ribbon 204 from the edges, instead of approaching a middle surface of the glass ribbon 204.

The plurality of gripping devices 162a, 162b may be arranged to allow the end effectors 160a, 160b to secure themselves to the glass ribbon 204. The plurality of gripping devices 162a, 162b may comprise, but are not limited to, suction cups or other suction devices, clamps, or the like. While the present description refers to a plurality of gripping devices, in some embodiments, the end effectors 160a, 160b may each comprise a single gripping device. In the illustrated embodiment, the plurality of gripping devices 162a, 162b can be aligned along the base frames 161a, 161b in a single file configuration (e.g., aligned along vertical axis Z of the depicted coordinate axes). However, in other embodiments, the plurality of gripping devices 162a, 162b may be arranged in other configurations where the plurality of gripping devices 162a, 162b are not in a single file. For example, there may be multiple rows of gripping devices (e.g., 2 parallel rows, 3 parallel rows, etc.). The plurality of gripping devices 162a, 162b may each define a plane of engagement 163. The plane of engagement 163 is the plane along which the plurality of gripping devices 162a, 162b are configured to contact the glass ribbon 204. For example, the plane of engagement 163 of the plurality of gripping devices 162a, 162b may be arranged to be substantially parallel to a plane of the glass ribbon 204 for engagement with the glass ribbon 204.

In embodiments where the plurality of gripping devices 162a, 162b comprise suction devices (e.g., suction cups) each of the suction devices may be plumbed to one or more vacuum pressure sources commutatively coupled to the controller 101. The controller 101 may communicate with the one or more vacuum pressure sources to apply vacuum (i.e., negative) pressure through the plurality of suction devices thereby sealing the plurality of suction devices against the glass ribbon 204. In some embodiments, the controller 101 may independently control the flow of vacuum pressure through each of the suction devices or groups thereof. Accordingly, vacuum pressure may be selectively delivered through all or a portion of the suction devices. In some embodiments, the one or more vacuum pressure sources may be configured to provide a positive pressure (e.g., a flow of air) through the plurality of suction devices to facilitate releasing the glass ribbon 204 or glass sheet 205 coupled thereto. In embodiments, the plurality of gripping devices 162a, 162b may engage the A side or the B side while the opposite side remains free from contact.

In embodiments where the plurality of gripping devices 162a, 162b comprise clamps, the clamps may comprise actuators communicatively coupled to the controller 101 such that the controller 101 can cause the clamps to open and close around an edge of the glass ribbon 204. This may allow for the simultaneous engagement of the plurality of gripping devices 162a, 162b with the A side and the B side of the glass ribbon 204.

In embodiments, the plurality of gripping devices 162a, 162b may be arranged in one or more (e.g., 2, 3, 4, etc.) groupings wherein each grouping can be independently actuatable to grip the glass ribbon 204. Each of the groupings may comprise one or more of the gripping devices. Each grouping may comprise the same number of gripping devices or a different number of gripping devices. The one or more groups may be independently controlled to apply a gripping force to the glass ribbon 204. For example, where a desired glass sheet 205 size is less than a vertical height (e.g., in the Z-direction of the depicted coordinate axes) of the end effectors 160a, 160b, only those gripping devices that would be in contact with the glass ribbon 204 may be actuated.

In various embodiments, the end effectors 160a, 160b may comprise tensioning actuators 170a, 170b, respectively, configured to adjust a position of the plurality of gripping devices 162a, 162b relative to the wrist joints 156a, 156b and thereby apply a tension T across the glass ribbon 204 in the lateral direction (i.e., in the +/−Y direction of the coordinate axes depicted in the figures). For example, the tensioning actuator 170a, 170b may comprise a pneumatic cylinder, a servo motor, or other actuator. In embodiments, the tensioning actuators 170a, 170b may be coupled to the base frames 161a, 161b between the base frames 161a, 161b and the wrist joints 156a, 156b. In some embodiments, the tensioning actuators 170a, 170b may form a portion of the base frames 161a, 161b. The tensioning actuators 170a, 170b may be communicatively coupled to the controller 101 such that the controller 101 controls a lateral position (e.g., in the +/−Y direction of the depicted coordinate axes) of the plurality of gripping devices 162a, 162b when engaged with the glass ribbon 204 with the tensioning actuators 170a, 170b. In some embodiments, each grouping of gripping devices may be coupled to a dedicated tensioning actuator, such that each grouping may be independently adjusted in the lateral direction when engaged with the glass ribbon 204. In some embodiments, instead of a dedicated tensioning actuator, tension may be provided by adjusting a posture of the robotic arms 146a, 146b to adjust a position of the plurality of gripping devices 162a, 162b. For example, the robotic arms 146a, 146b may pull the end effectors 160a, 160b laterally to apply tension to the glass ribbon 204.

Referring again to FIG. 1, the first robotic handling device 142 and the second robotic handling device 144 may be operated by the controller 101 to perform coordinated motion such that the second robotic handling device 144 maintains the same spatial relationship with the first robotic handling device 142 while performing a bending operation to separate a glass sheet 205 from the glass ribbon 204 and/or to otherwise transport a separated glass sheet 205. In embodiments, a predetermined positional relationship between the first robotic handling device 142 and the second robotic handling device 144 can be determined by direct measurement, fixture calibration, and/or vision calibration (e.g., using one or more optical sensors). That is, the predetermined positional relationship may be defined such that the controller 101 synchronizes motion of the second robotic handling device 144 relative to the first robotic handling device 142. For example, wherein a predetermined positional relationship is defined between the first robotic handling device and the second robotic handling device, the second robotic handling device may maintain that positional relationship throughout coordinated movement of the first robotic handling device 142 and the second robotic handing device 144. Accordingly, during a bending operation and/or transport operation, the spatial relationship between the first robotic handling device 142 and the second robotic handling device 144 may be kept constant by the controller 101. Thus, during such coordinated and communicated (e.g., through controller 101) movement of the first robotic handling device 142 and the second robotic handling device 144, the first robotic handling device 142 can be a master robotic handling device and the second robotic handling device 144 can be a slave robotic handling device.

As the glass ribbon 204 is drawn along the draw path 250, the free end 207 of the glass ribbon 204 may move out-of-plane with the draw path 250 (e.g., the free end 207 may twist or sway). Under such circumstances, a plane of engagement 163 of the end effector 160a, 160b of the first robotic handling device 142 and/or the second robotic handling device 144 may be independently adjusted relative to the draw path 250 to engage a respective edge (e.g., first edge 211, and second edge 213) of the glass ribbon 204. Upon engagement 163, the end effector 160a, 160b of the first robotic handling device 142 and the second robotic handling device 144 may be moved into a parallel orientation with the draw path 250. In some embodiments, an operator may be provided with controls communicatively coupled to the controller 101 to manually adjust a position of the end effector 160a, 160b of the first robotic handling device 142 and the second robotic handling device 144. In other embodiments, one or more sensors (e.g., cameras, ultrasonic sensors, infrared radiation sensors, or the like), may be arranged to output a signal indicative of a sheet orientation (e.g., the twisting or other out of plane movement of the free end 207 of the glass ribbon 204). Based on the output of such sensors, the controller 101 may automatically adjust a plane of engagement 163 of the end effectors 160a, 160b of the first robotic handling device 142 and the second robotic handling device 144.

Once engaged with the glass ribbon 204, the tensioning actuator 170a, 170b of the first robotic handling device 142 and the second robotic handling device 144 may be actuated to provide a tension T to the glass ribbon 204 transverse to the conveyance direction 252. That is, the tensioning actuator 170a of the first robotic handling device 142 may apply a pulling force in a first direction transverse to the conveyance direction 252 and the tensioning actuator 170b of the second robotic handling device 144 may apply a pulling force in a second direction opposite the first direction. The tension T may encourage snap-off of a glass sheet 205 at the score line 208 during bending.

Figure 3:
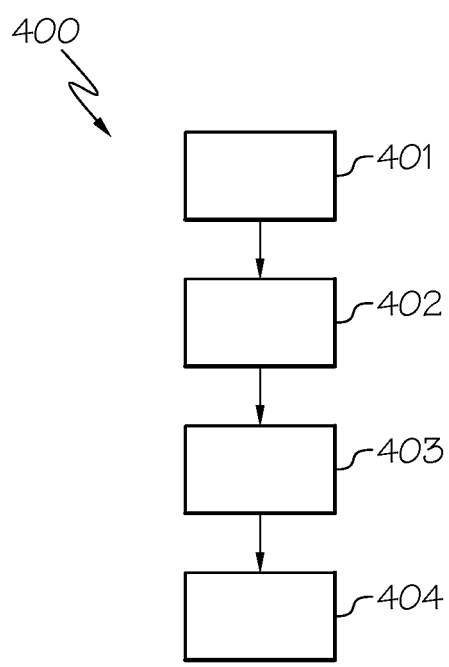
FIG. 3 is a flowchart depicting a method of separating a glass sheet from a glass ribbon according to one or more embodiments shown and described herein.

FIG. 3 illustrates a flowchart depicting a method 400 of separating of the glass sheet 205 from the glass ribbon 204. While the flowchart depicts steps according to a certain order, such steps may be performed in any order and/or simultaneously to one another. Additionally, the methods provided herein may comprise a greater or fewer number of steps without departing from the scope of the present disclosure.

At step 401, the method 400 can comprise forming the glass ribbon 204, and/or drawing the glass ribbon 204 along the draw path 250 in the conveyance direction 252. As illustrated in FIG. 2A, as the glass ribbon 204 exits the forming apparatus 241 (shown in FIG. 1) at exit position 10, the glass ribbon is directed into the glass separation apparatus 100.

Referring again to FIG. 3, at step 402, the score line 208 may be produced across at least a portion of the width of the glass ribbon 204. For example, and with reference to FIGS.

2A and 2B, once the glass ribbon 204 has reached a predetermined length (e.g., such as where a free end 207 of the glass ribbon 204 has reached a desired sheet length relative to root 239), the controller 101 may operate the moving scoring apparatus 110 to produce a score line 208 across at least a portion of the glass ribbon 204 in the lateral direction (i.e., +/−Y direction of the depicted coordinate axes). That is, the controller 101 may move the scoring device 112 into contact with a first side (e.g., the A side of the glass ribbon 204) and the nosing 116 into contact with a second side (e.g., the B side of the glass ribbon 204) of the glass ribbon 204 opposite the scoring device 112 such that the glass ribbon 204 is impinged between the scoring device 112 and the nosing 116. The scoring device 112 may then be traversed across at least of portion of the glass ribbon 204 in a direction transverse to the conveyance direction 252, thereby forming a score line 208 in the glass ribbon 204. FIG. 2B illustrates motion of the moving scoring apparatus 110 from the moving scoring apparatus home position 12 through the scoring zone 14, to the score completion line 16, wherein scoring is complete.

Referring again to FIG. 3, at step 403, prior to, contemporaneous with, or after the glass ribbon 204 is scored, the first robotic handling device 142 and the second robotic handling device 144 can be attached to the B-side of the glass ribbon 204 downstream of the moving scoring apparatus 110. That is, the first robotic handling device 142 may engage the first edge 211 of the glass ribbon 204 at a position downstream of the score line 28 in the conveyance direction 252 and the second robotic handling device 144 may engage the second edge 213 of the glass ribbon at a position downstream of the score line 208 in the conveyance direction. The end effectors 160a, 160b of the first robotic handling device 142 and the second robotic handling device 144 may be maneuvered into place with the respective robotic arms 146a, 146b as described above.

If the free end 207 of the glass ribbon 204 becomes twisted, or otherwise positioned out-of-plane from the draw path 250, the method may comprise adjusting an engagement plane 163 of the end effector 160a, of the first robotic handling device 142, the end effector 160b of the second robotic handling device 144, or both, to substantially match a plane of the edges 211, 213 of the glass ribbon 204 to engage the glass ribbon 204. Upon engagement, the end effectors 160a, 160b of the first robotic handling device 142 and the second robotic handling device 144 may move to realign the glass ribbon 204 with the draw path 250. Additionally, the tensioning actuators 170a, 170b of the first robotic handling device 142 and the second robotic handling device 144 may be actuated to provide a tension T across the glass ribbon 204 in a direction transverse to the conveyance direction 252.

At step 404, and as illustrated in FIG. 2C, upon completion of the scoring operation, the first robotic handling device 142 and the second robotic handling device 144 may be maneuvered with their respective robotic arms 146a, 146b to apply a bending moment to the glass ribbon 204 about the score line 208, thereby separating a glass sheet 205 from the glass ribbon 204. The first robotic handling device 142 and the second robotic handling device 144 may then transport the separated glass sheet 205 for subsequent processing. For example, as illustrated in FIG. 2D, the first robotic handling device 142 and the second robotic handling device 144 may move along rail 152 to transport the glass sheet 205 to a desired location. The first robotic handling device 142 and the second robotic handling device 144 may maintain the transverse tension T in the glass sheet 205 throughout transportation. In some embodiments, once the destination is reached, the controller 101 can cause the first robotic handling device and the second robotic handling device to release the glass sheet 205.

Figure 4A:
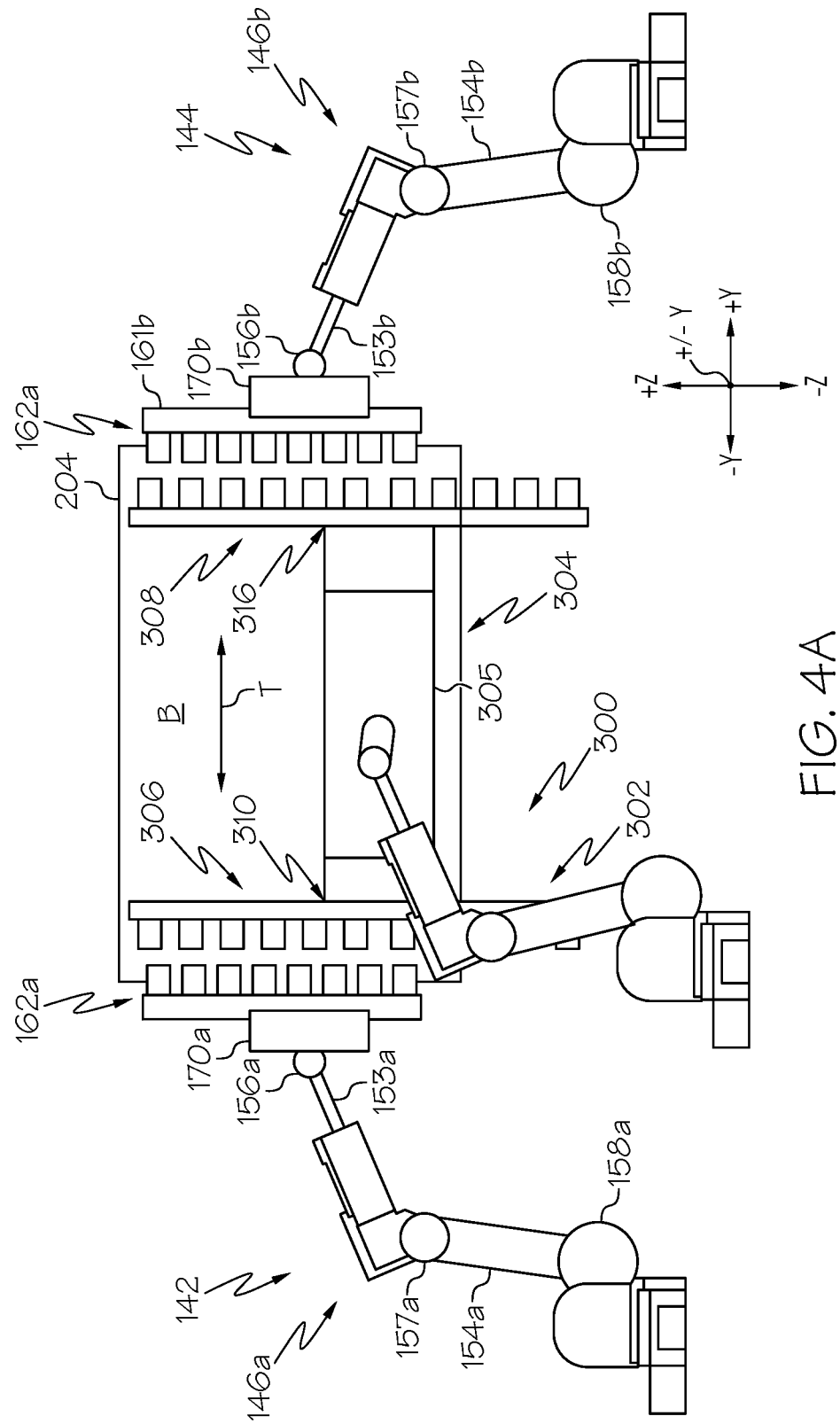
FIG. 4A schematically illustrates a hand-off of a glass sheet to downstream manufacturing apparatus according to one or more embodiments shown and described herein.
Figure 4B:
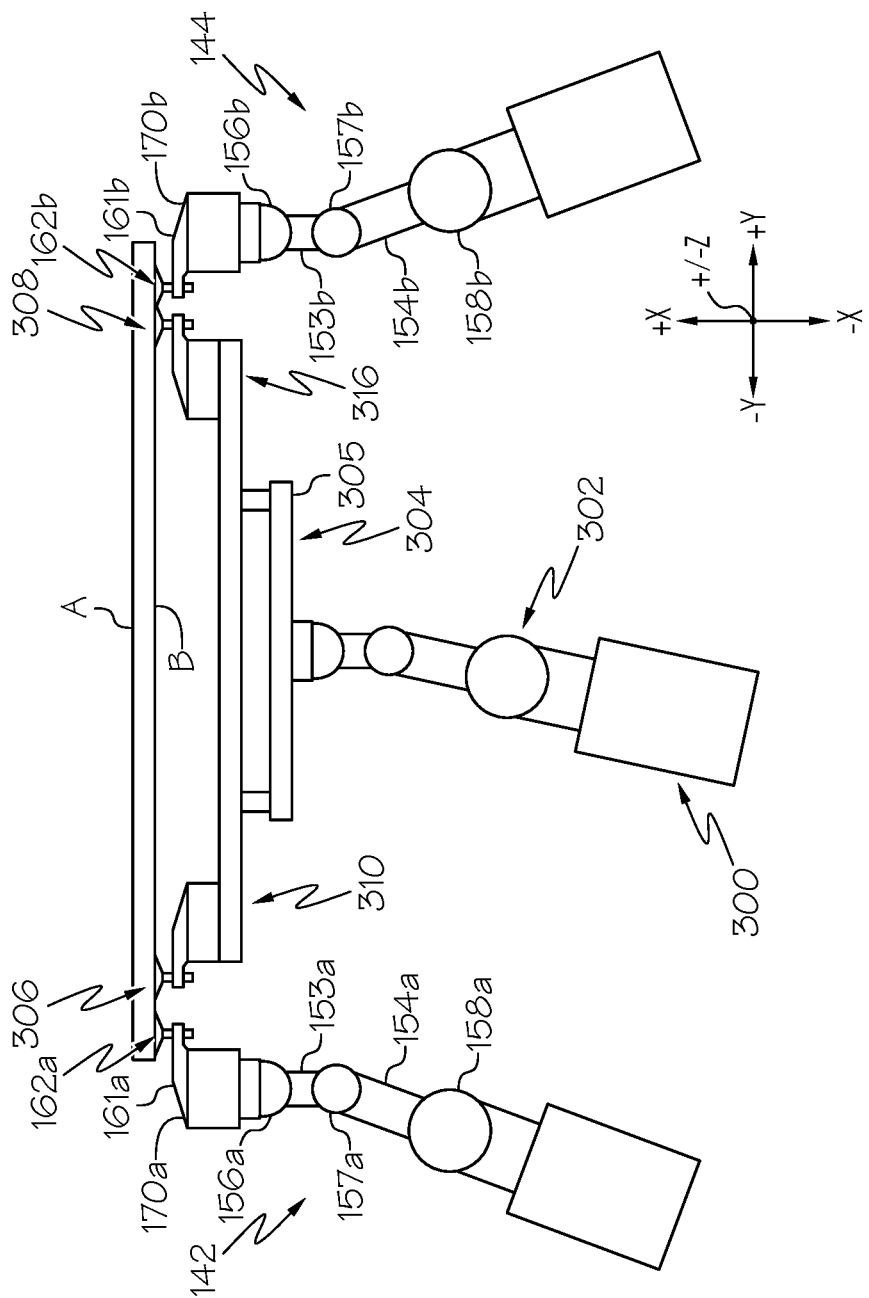
FIG. 4B schematically illustrates a view of the hand-off of FIG. 4A in the —Z-direction of the depicted coordinate axes according to one or more embodiments shown and described herein.

FIGS. 4A and 4B illustrate a hand-off operation from the first robotic handling device 142 and the second robotic handling device 144 to a third robotic handling device 300. The third robotic handling device 300 may be like the first and second robotic handling devices in that the third robotic handling device 300 may comprise a third robotic arm 302 configured for multi-axis articulation (e.g., 3-axis articulation, 4-axis articulation, 5-axis articulation, 6 axis articulation, or more). A third end effector 304 may be attached to the third robotic arm 302 and may be configured to simultaneously engage the glass sheet 205 at a position proximate to a first edge 211 and a second edge 213 of the glass sheet 205. In embodiments, when engaged with the glass sheet 205, the third end effector 304 may engage the glass sheet 205 at a position inboard (i.e. closer to a centerline of the glass sheet 205) of the end effector 160a and end effector 160b. In some embodiments, the third robotic handling device 300 may be a slave robotic handling device relative to either one or both the first robotic handling device 142 or the second robotic handling device 144 and communicate therewith, for example through controller 101. That is, movement of the third robotic handling device can be controlled by controller 101 to coordinate with movement of the first robotic handling device 142 and/or the second robotic handling device via feedback from the first robotic handling device 142, the second robotic handling device 144, and/or the third robotic handling device 300.

The third end effector 304 may comprise a third end effector frame 305. Attached to a first gripping portion 306 may be attached to a first end 310 of the third end effector frame 305 and a second gripping portion 308 may be attached to a second end 312 of the third end effector frame 305. Each of the first and second gripping portions 306, 308 may comprise one or more gripping devices (e.g., suction cups or other suction devices, clamps, or the like). The first gripping portion 306 may engage the glass sheet 205 proximate to an engagement position of the plurality of gripping devices 162a of the first robotic handling device 142, and the second gripping portion 308 may engage the glass sheet 205 proximate to the plurality of gripping devices 162b of the second robotic handling device 144 outside of a quality area of the glass sheet 205. As used herein, the quality area of the glass sheet refers to an interior or central portion of the glass sheet. Stated another way, the third end effector 304 may engage the glass sheet 205 between an engagement position of the first robotic handling device 142 and an engagement position of the second robotic handling device 144. As illustrated in FIG. 4B the first robotic handling device 142, the second robotic handling device 144, and the third robotic handling device 300, may all engage the glass ribbon 204 on the same side (e.g., the B side) thus preserving the surface quality of the opposite side (e.g., the A side), and the quality area of the opposite side. In some embodiments, the third robotic handling device 300 may instead engage the opposite side of the glass ribbon 204 from the first robotic handling device 142 and the second robotic handling device 144. Maintaining tension with the tensioning actuators 170a, 170b during hand-off of the glass sheet 205 to the third robotic handling device 300 may preventing unwanted sheet sway or bow of the glass sheet that may otherwise be caused by the third robotic handling device 300 approaching the glass sheet 205. Stated another way, the effect of air turbulence against the glass sheet caused by the third robotic handling device 300 may be mitigated due to the tension T applied to the glass sheet 205.

In some embodiments, the first robotic handling device 142 and the second robotic handling device 144 may instead transfer the glass sheet 205 to an overhead conveyor, a stack, or additional processing stations. Once the first and second robotic handling devices 142, 144 have released the glass sheet 205, the first and second robotic handling devices 142, 144 may return to the draw path 250 to separate another glass sheet 205 from the glass ribbon 204.

In some embodiments, the first robotic handling device 142 and the second robotic handling device 144 may be used to retrieve a glass sheet from a conveyor (e.g., a vertical conveyor, a horizontal conveyor, or the like), a stack, or processing stations. For example, the first robotic handling device 142 and the second robotic handling device 144 may be moved in synchronization to engage with a glass sheet attached to a conveyor and remove the glass sheet from the conveyor. Once removed from the conveyor, the first robotic handling device 142 and the second robotic handling device 144 may stack the glass sheet (e.g., vertically or horizontally) for storage, transport, or the like, or the first robotic handling device 142 and the second robotic handling device may hand-off the glass sheet to another robotic handling device (e.g., robotic handling device 300). In yet further embodiments, the first robotic handling device 142 and the second robotic handling device 144 may move in synchronization to engage a glass sheet in a stack of glass sheets and transport the glass sheet to a conveyor, another robotic handling device, etc.

Apparatuses and methods described herein may be used to separate glass sheets from glass ribbons, such as the glass ribbons produced with the fusion draw process or similar downdraw processes. It should now be understood that the apparatuses and methods as described herein use a dual robotic handling device including a first robotic handling device and a second robotic handling device that can move in synchronization to bend a glass ribbon about a score line to separate a glass sheet from the glass ribbon about the score line. Using a dual robotic handling device rather than a single robotic handling device provides several benefits. For example, a weight of the glass sheet may be distributed between two robotic handling apparatuses which may allow production of larger glass sheets and/or faster handling and/or transport thereof. Moreover, because the robotic handling apparatuses may approach the glass ribbon from an edge of the glass ribbon, instead of approaching a center surface of the glass ribbon as may be necessary for a single robotic handling device, air turbulence caused by such approach may be minimized, resulting in less swaying within the glass ribbon during engagement, which may improve engagement with the glass ribbon. Furthermore, the dual robotic handling apparatus may provide rotation-free hand-off, such that only one side of the glass ribbon may be engaged, thus completely preserving surface quality on the opposite side.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for separating and transporting a glass sheet from a glass ribbon, the method comprising:

drawing the glass ribbon on a draw path in a conveyance direction;

scoring the glass ribbon with a scoring device, thereby producing a score line across at least a portion of a width of the glass ribbon;

positioning an end effector of a first robotic handling device proximate the glass ribbon, wherein the end effector of the first robotic handling device is coupled to a robotic arm of the first robotic handling device with a wrist joint;

positioning an end effector of a second robotic handling device proximate the glass ribbon, wherein the end effector of the second robotic handling device is coupled to a robotic arm of the second robotic handling device with a wrist joint;

adjusting an engagement plane of the end effector of the first robotic handling device relative to the draw path to be substantially parallel to the plane of the glass ribbon with the wrist joint of the first robotic handling device;

adjusting an engagement plane of the end effector of the second robotic handling device relative to the draw path independent of the first robotic handling device to be substantially parallel to the plane of the glass ribbon with the wrist joint of the second robotic handling device;

engaging a first edge of the glass ribbon at a first position downstream of the score line in the conveyance direction with the end effector of the first robotic handling device;

engaging a second edge of the glass ribbon at a second position downstream of the score line in the conveyance direction with the end effector of the second robotic handling device; and synchronously moving the first robotic handling device and the second robotic handling device to bend the glass ribbon about the score line to separate the glass sheet from the glass ribbon.

2. The method of claim 1, further comprising:

engaging the glass sheet with a third robotic handling device between an engagement position of the first robotic handling device on the glass sheet and an engagement position of the second robotic handling device on the glass sheet; and releasing the glass sheet from the first robotic handling device and the second robotic handling device.

3. The method of claim 1, further comprising applying tension across the width of the glass ribbon with the first robotic handling device and the second robotic handling device transverse to the conveyance direction.

4. The method of claim 1, wherein the glass ribbon comprises a first major surface opposite a second major surface, and the first robotic handling device and the second robotic handling device contact only the second major surface.

5. The method of claim 1, wherein the first robotic handling device comprises a first plurality of gripping devices comprising a first plurality of suction devices and the second robotic handling device comprises a second plurality of gripping devices comprising a second plurality of suction devices.

6. The method of claim 1, wherein each of the first robotic handling device and the second robotic handling device are mounted to a rail and positioning of the first robotic handling device and the second robotic handling device are adjustable along the rail, the method further comprising moving the first robotic handling device and the second robotic handling device along the rail to transport the glass sheet from the draw path.

7. A method for separating and transporting a glass sheet from a glass ribbon, the method comprising:
drawing the glass ribbon on a draw path in a conveyance direction, the glass ribbon comprising a first major surface opposite a second major surface;
scoring the glass ribbon with a scoring device, thereby producing a score line across at least a portion of the first major surface;
positioning an end effector of a first robotic handling device proximate the glass ribbon, wherein the end effector of the first robotic handling device is coupled to a robotic arm of the first robotic handling device with a wrist joint;
positioning an end effector of a second robotic handling device proximate the glass ribbon, wherein the end effector of the second robotic handling device is coupled to a robotic arm of the second robotic handling device with a wrist joint;
adjusting an engagement plane of the end effector of the first robotic handling device relative to the draw path to be substantially parallel to the plane of the glass ribbon with the wrist joint of the first robotic handling device;
adjusting an engagement plane of the end effector of the second robotic handling device relative to the draw path independent of the first robotic handling device to be substantially parallel to the plane of the glass ribbon with the wrist joint of the second robotic handling device;
engaging a first edge of the second major surface at a first position downstream of the score line in the conveyance direction with the end effector of the first robotic handling device;
engaging a second edge of the second major surface at a second position downstream of the score line in the conveyance direction with the end effector of the second robotic handling device; and
synchronously moving the first robotic handling device and the second robotic handling device to bend the glass ribbon about the score line to separate the glass sheet from the glass ribbon.

8. The method of claim 7, further comprising:
engaging the second major surface of the glass sheet with a third robotic handling device between an engagement position of the first robotic handling device on the glass sheet and an engagement position of the second robotic handling device on the glass sheet; and
releasing the glass sheet from the first robotic handling device and the second robotic handling device.

9. The method of claim 7, further comprising applying tension across a width of the glass ribbon with the first robotic handling device and the second robotic handling device transverse to the conveyance direction.

10. The method of claim 7, wherein:
the first robotic handling device comprises a first plurality of suction devices; and
the second robotic handling device comprises a second plurality of suction devices.

11. The method of claim 10, wherein:
the first plurality of suction devices comprises two or more groups of suction devices, and a flow of vacuum pressure through the two or more groups of suction devices of the first plurality of suction devices is independently controllable; and the second plurality of suction devices comprises two or more groups of suction devices, and a flow of vacuum pressure through the two or more groups of suction devices of the second plurality of suction devices is independently controllable.

12. A method manufacturing a glass sheet, the method comprising:
forming a glass ribbon with a fusion glass manufacturing assembly;
drawing the glass ribbon on a draw path in a conveyance direction;
scoring the glass ribbon with a scoring device, thereby producing a score line across at least a portion of a width of the glass ribbon;
positioning an end effector of a first robotic handling device proximate the glass ribbon, wherein the end effector of the first robotic handling device is coupled to a robotic arm of the first robotic handling device with a wrist joint;
positioning an end effector of a second robotic handling device proximate the glass ribbon, wherein the end effector of the second robotic handling device is coupled to a robotic arm of the second robotic handling device with a wrist joint;
adjusting an engagement plane of the end effector of the first robotic handling device relative to the draw path to be substantially parallel to the plane of the glass ribbon with the wrist joint of the first robotic handling device;
adjusting an engagement plane of the end effector of the second robotic handling device relative to the draw path independent of the first robotic handling device to be substantially parallel to the plane of the glass ribbon with the wrist joint of the second robotic handling device;
engaging a first edge of the glass ribbon at a first position downstream of the score line in the conveyance direction with the end effector of the first robotic handling device;
engaging a second edge of the glass ribbon at a second position downstream of the score line in the conveyance direction with the end effector of the second robotic handling device; and
synchronously moving the first robotic handling device and the second robotic handling device to bend the glass ribbon about the score line to separate the glass sheet from the glass ribbon.

13. The method of claim 12, further comprising:
engaging the glass sheet with a third robotic handling device between an engagement position of the first robotic handling device on the glass sheet and an engagement position of the second robotic handling device on the glass sheet; and
releasing the glass sheet from the first robotic handling device and the second robotic handling device.

14. The method of claim 12, further comprising applying tension across the width of the glass ribbon with the first robotic handling device and the second robotic handling device transverse to the conveyance direction.

15. The method of claim 12, wherein the glass ribbon comprises a first major surface opposite a second major surface, and the first robotic handling device and the second robotic handling device contact only the second major surface.

16. The method of claim 12, wherein the first robotic handling device comprises a first plurality of suction devices, the first plurality of suction devices comprising two or more groups of suction devices, and a flow of vacuum pressure through the two or more groups of suction devices of the first plurality of suction devices is independently controllable.

17. The method of claim 12, wherein the second robotic handling device comprises a second plurality of suction devices, the second plurality of suction devices comprising two or more groups of suction devices, and a flow of vacuum pressure through the two or more groups of suction devices of the second plurality of suction devices is independently controllable.

* * * * *